United States Patent
Tomimatsu

(10) Patent No.: US 8,191,958 B2
(45) Date of Patent: Jun. 5, 2012

(54) VEHICLE FRONT STRUCTURE

(75) Inventor: Hirokazu Tomimatsu, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 431 days.

(21) Appl. No.: 12/445,206

(22) PCT Filed: Oct. 11, 2007

(86) PCT No.: PCT/JP2007/069886
§ 371 (c)(1),
(2), (4) Date: Apr. 10, 2009

(87) PCT Pub. No.: WO2008/047688
PCT Pub. Date: Apr. 24, 2008

(65) Prior Publication Data
US 2010/0007177 A1    Jan. 14, 2010

(30) Foreign Application Priority Data
Oct. 19, 2006  (JP) ................... 2006-285029

(51) Int. Cl.
*B62D 25/10* (2006.01)
(52) U.S. Cl. ............... 296/187.09; 296/203.02
(58) Field of Classification Search ........ 296/203.02, 296/187.09, 193.09, 193.1, 193.11, 190.01
See application file for complete search history.

(56) References Cited

U.S. PATENT DOCUMENTS
2005/0001453 A1 * 1/2005 Endo et al. ............ 296/193.11

FOREIGN PATENT DOCUMENTS
JP  2500145 Y2  6/1996
JP  2000-302061 A  10/2000
* cited by examiner Primary Examiner — Glenn Dayoan
Assistant Examiner — Melissa A Black

(57) ABSTRACT

A vehicle front structure 1 includes a front panel 10, a center reinforcing member 20, side reinforcing members 30, protective members 40, and pipes 50. The front panel 10 is mounted on a front surface of a vehicle body 2. The pipes 50 cross, along a rear surface of the front panel 10, a peripheral portion of the front panel 10 at a rear surface side of the front panel 10. The protective members 40 are fixed to the front panel 10. Each protective member 40 includes a plate-like cover portion 41 and at least two plate-like impact absorbing portions 46. The cover portion 41 protrudes toward the front of a vehicle, has a substantially U-shape in a cross-sectional view, and covers the pipes 50 from the front side of the vehicle. The impact absorbing portions 46 are disposed outside the cover portion 41 at both sides of the pipes 50, protrude toward the back of the vehicle, and each have a substantially U-shape in a cross-sectional view.

4 Claims, 7 Drawing Sheets

US 8,191,958 B2

VEHICLE FRONT STRUCTURE

TECHNICAL FIELD

The present invention relates to a vehicle front structure.

BACKGROUND ART

A structure in which a lid in mounted on a front face of a vehicle has been known.

Patent Document 1: Japanese Utility Model Registration NO. 2500145

DISCLOSURE OF THE INVENTION

Problem to be Solved by the Invention

With the above-described structure, when a lid (hereinafter referred to as a front plate member) receives an impact from the front of a vehicle, the impact is transmitted to a peripheral portion of the front plate member. For this reason, when pipes or harnesses (hereinafter referred to as linear members) are disposed at a rear surface side of the plate member so as to cross the peripheral portion of the front plate member, the peripheral portion of the front plate member might contact and damage these linear members.

The present invention has been made to solve the foregoing problem and an object thereof is to provide a vehicle front structure capable of protecting a linear member against an impact applied to a front plate member from a front of a vehicle.

Means For Solving the Problem

To attain the object, the present invention includes a front plate member, a linear member, and a protective member. The front plate member is mounted on a front surface of a vehicle body. The linear member crosses, along a rear surface of the front plate member, a peripheral portion of the front plate member at a rear surface side of the front plate member. The protective member is fixed to the front plate member. The protective member includes a plate-like cover portion and at least two plate-like impact absorbing portions. The cover portion protrudes toward a front of the vehicle, has a substantially U-shape in a cross-sectional view, and covers the linear member from the front side of the vehicle. The impact absorbing portions are disposed outside the cover portion at both sides of the linear member, protrude toward a back of the vehicle, and each have a substantially U-shape in a cross-sectional view.

With the above-described structure, when the front plate member receives an impact from the front of the vehicle, this impact is transmitted from the peripheral portion of the front plate member to the impact absorbing portions. Then, the impact absorbing portions prevent the front plate member from moving toward the back of the vehicle by contacting a vehicle body, and absorb the impact by being deformed. Accordingly, as the impact absorbing portions absorb the impact, the impact to be applied to the cover portion between the two impact absorbing portions is reduced. Thereby, the linear member covered with the cover portion is reliably protected. Moreover, since the protective member is fixed to the front plate member, the construction of the vehicle body around the linear member can be simplified.

Meanwhile, the cover member and the impact absorbing portions may be integrally formed. In this case, the impact absorbing portions are bent toward the front of the vehicle, at both edge portions of the cover portion in a direction intersecting the linear member.

With the above-described structure, since the cover portion and the impact absorbing portions are integrally formed, it is possible to reduce the number of components and to simply the construction of the protective member.

Further, both edge portions of the cover portion in a direction along the linear member may be bent toward the front of the vehicle.

With the above-described structure, rigidity of the cover portion can be increased.

Effect of the Invention

According to the vehicle front structure of the present invention, it is possible to protect the linear member against an impact applied to the front plate member from the front of the vehicle.

EXPLANATION OF REFERENCE NUMERALS

1 VEHICLE FRONT STRUCTURE
2 VEHICLE BODY
10 FRONT PANEL (FRONT PLATE MEMBER)
20 CENTER REINFORCING MEMBER
30 SIDE REINFORCING MEMBER
40 PROTECTIVE MEMBER
41 COVER PORTION
46 IMPACT ABSORBING PORTION
50 PIPE (LINEAR MEMBER)

BEST MODE FOR CARRYING OUT THE INVENTION

Figure 1:
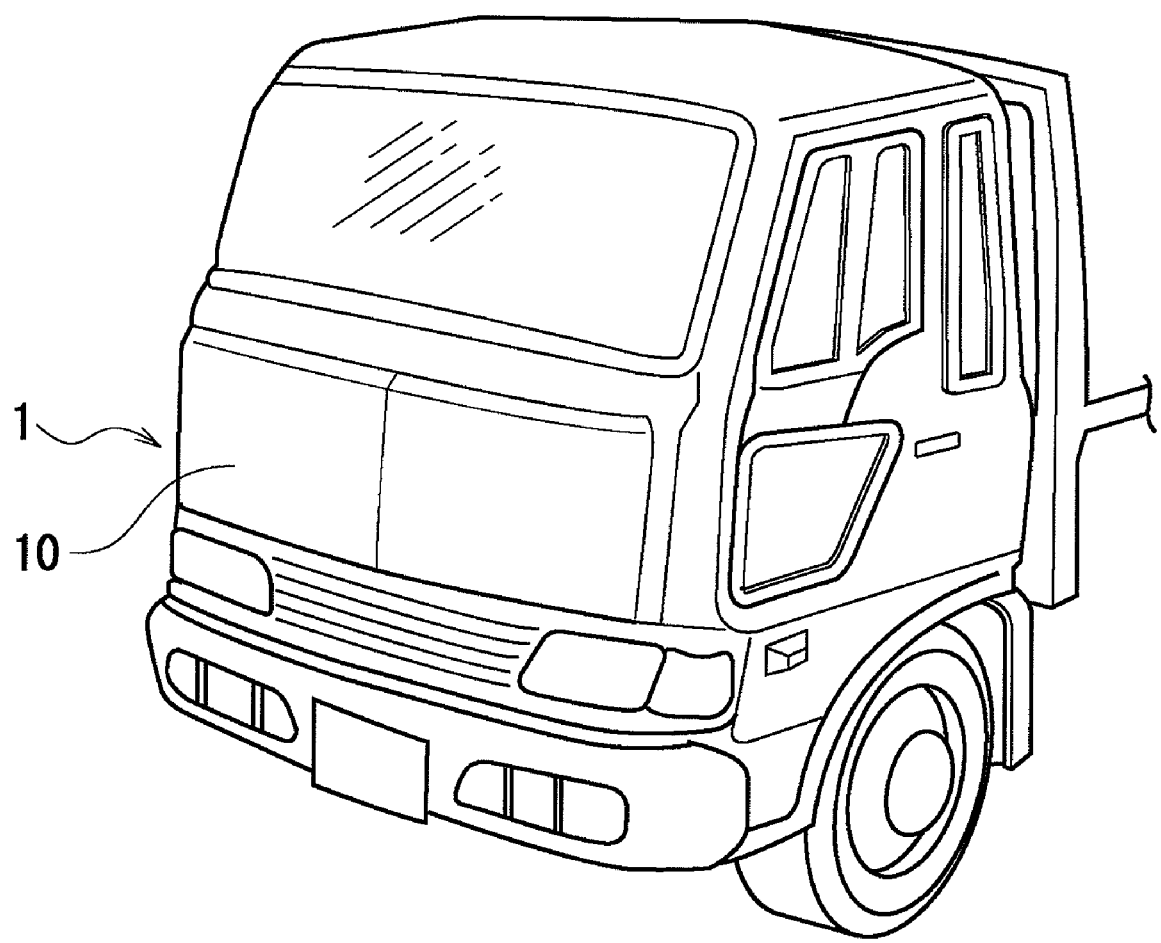
FIG. 1 is an external perspective view of a vehicle front structure according to an embodiment.
Figure 2:
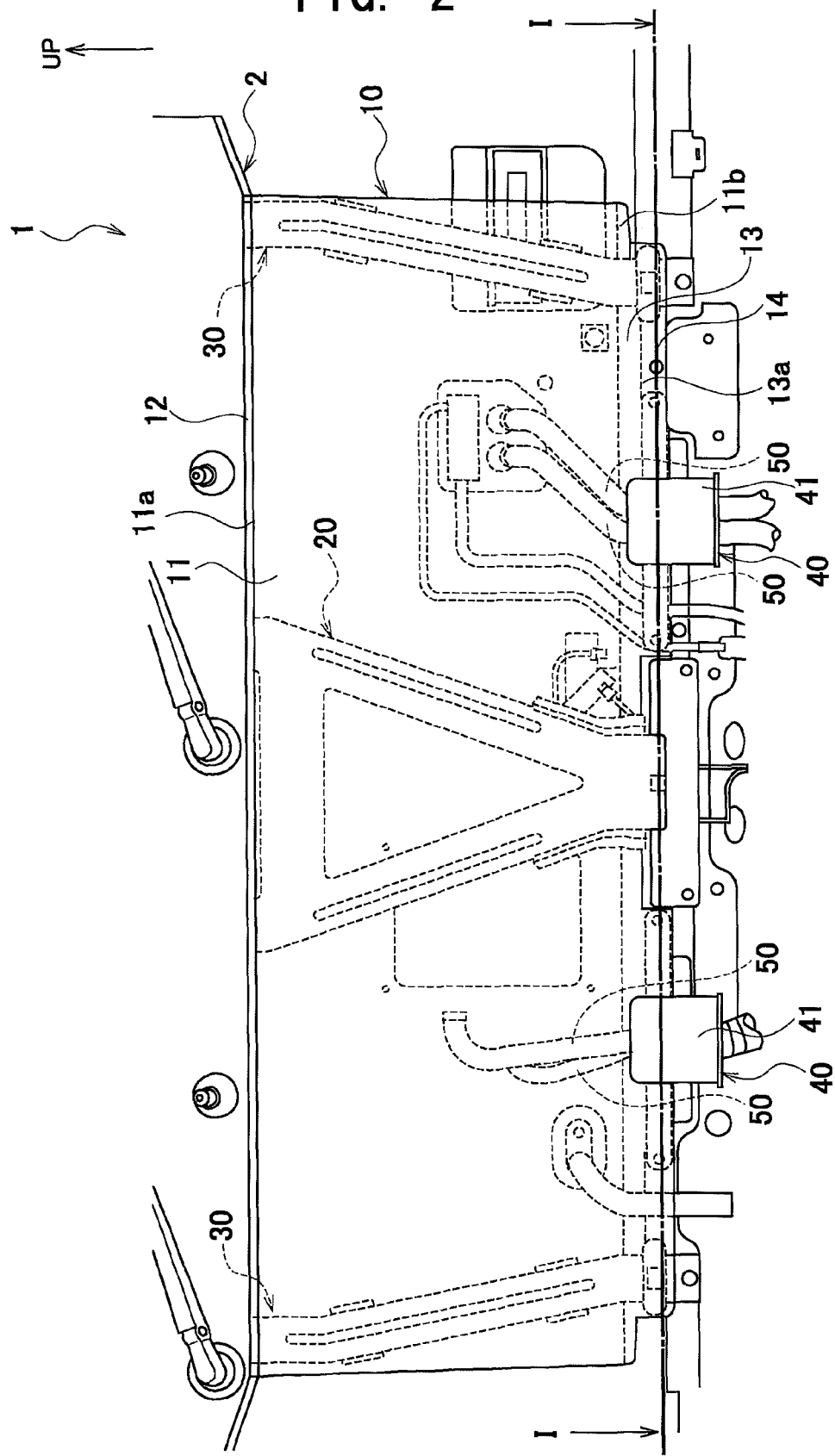
FIG. 2 is a schematic front view of the vehicle front structure according to the embodiment.
Figure 3:
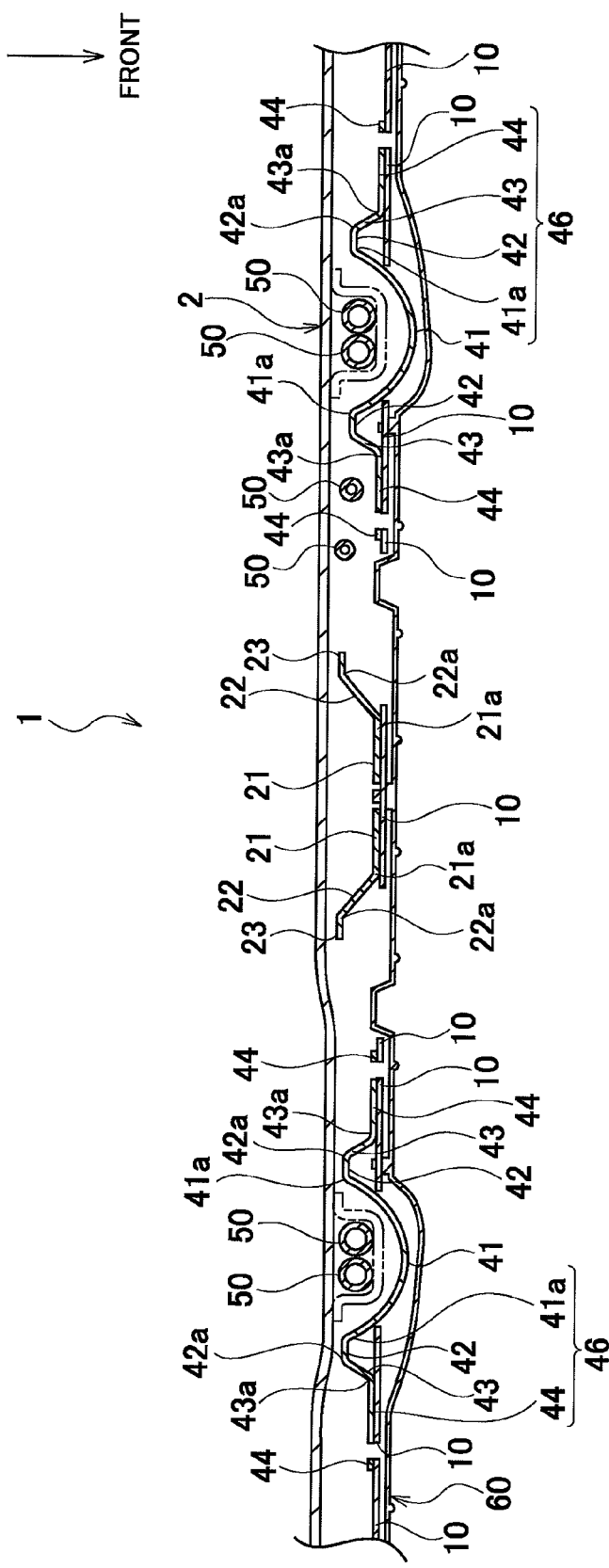
FIG. 3 is a cross-sectional view taken along an I-I arrow in FIG. 2.
Figure 4:
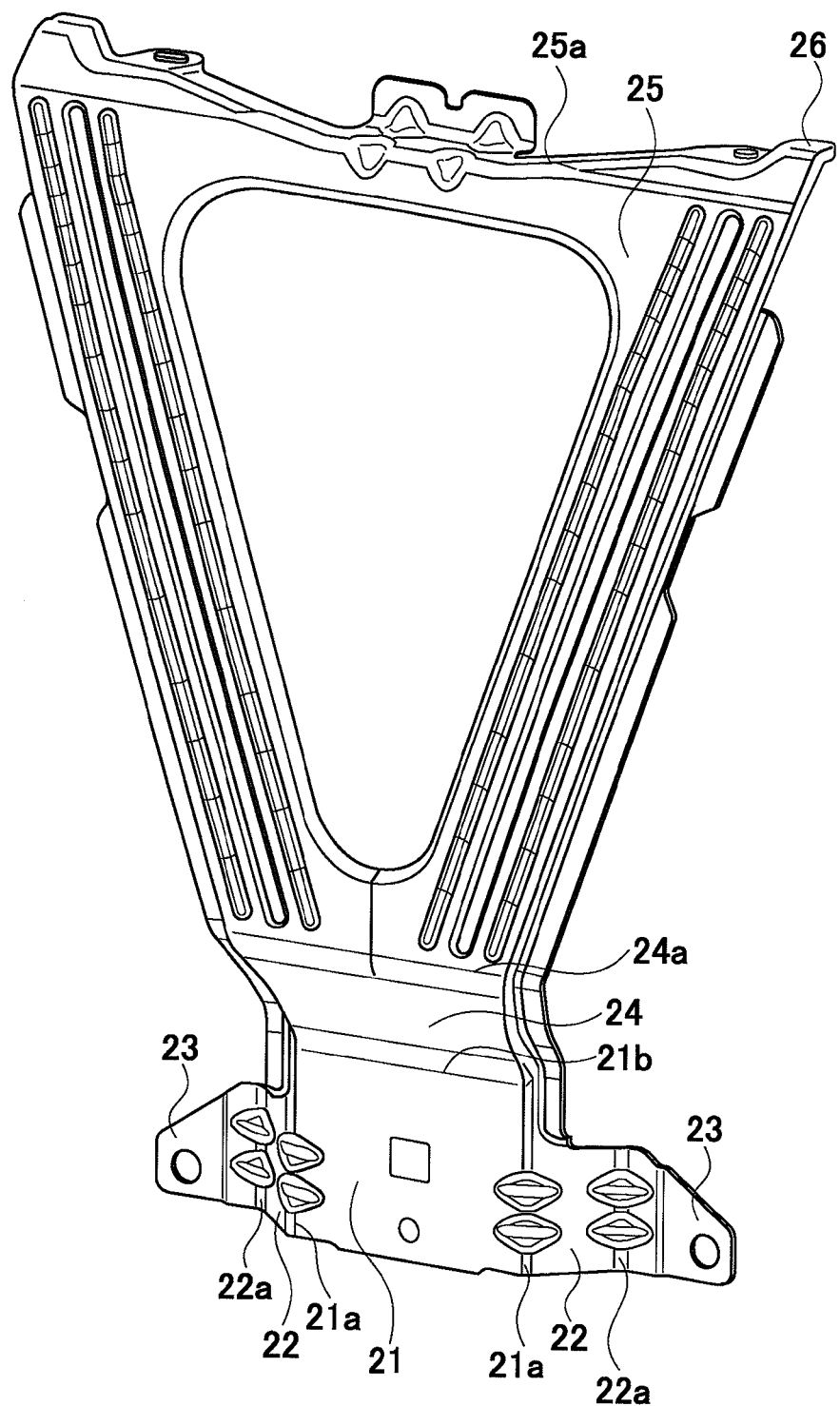
FIG. 4 is a schematic perspective view of a center reinforcing member.
Figure 5:
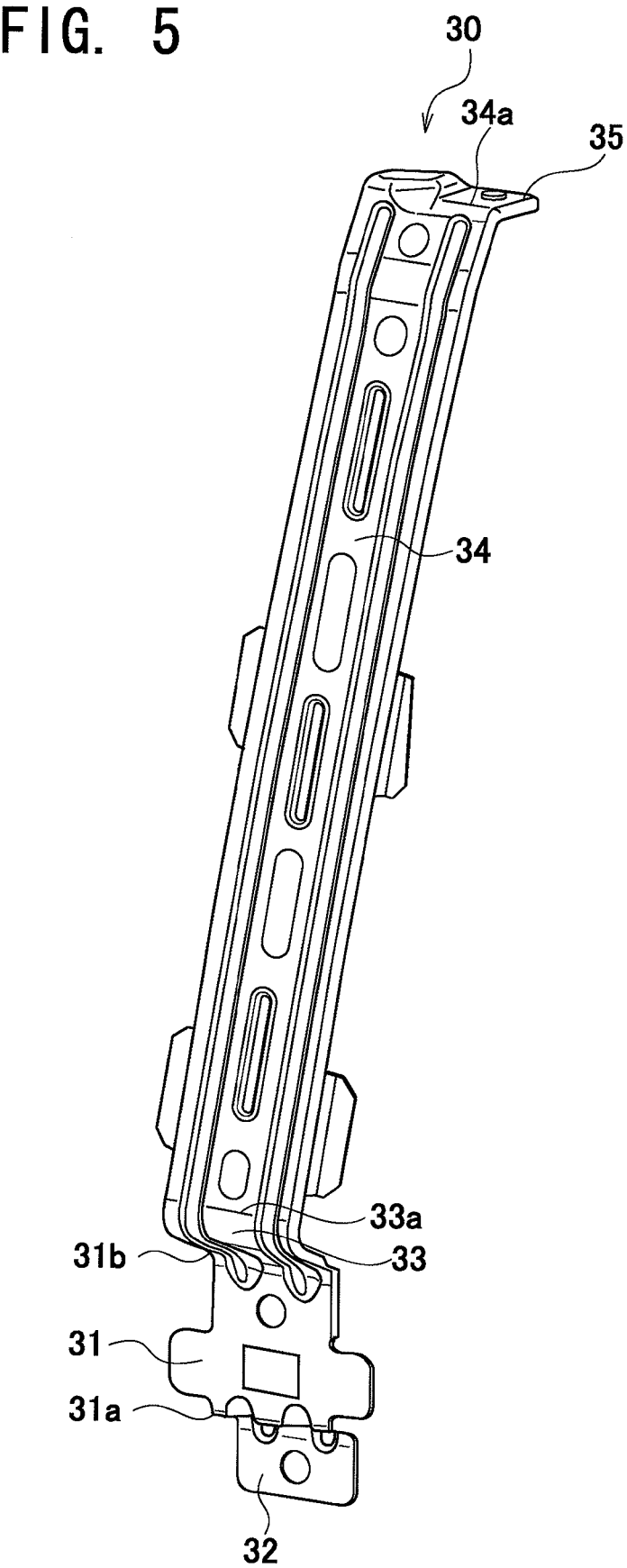
FIG. 5 is a schematic perspective view of a side reinforcing member.
Figure 6:
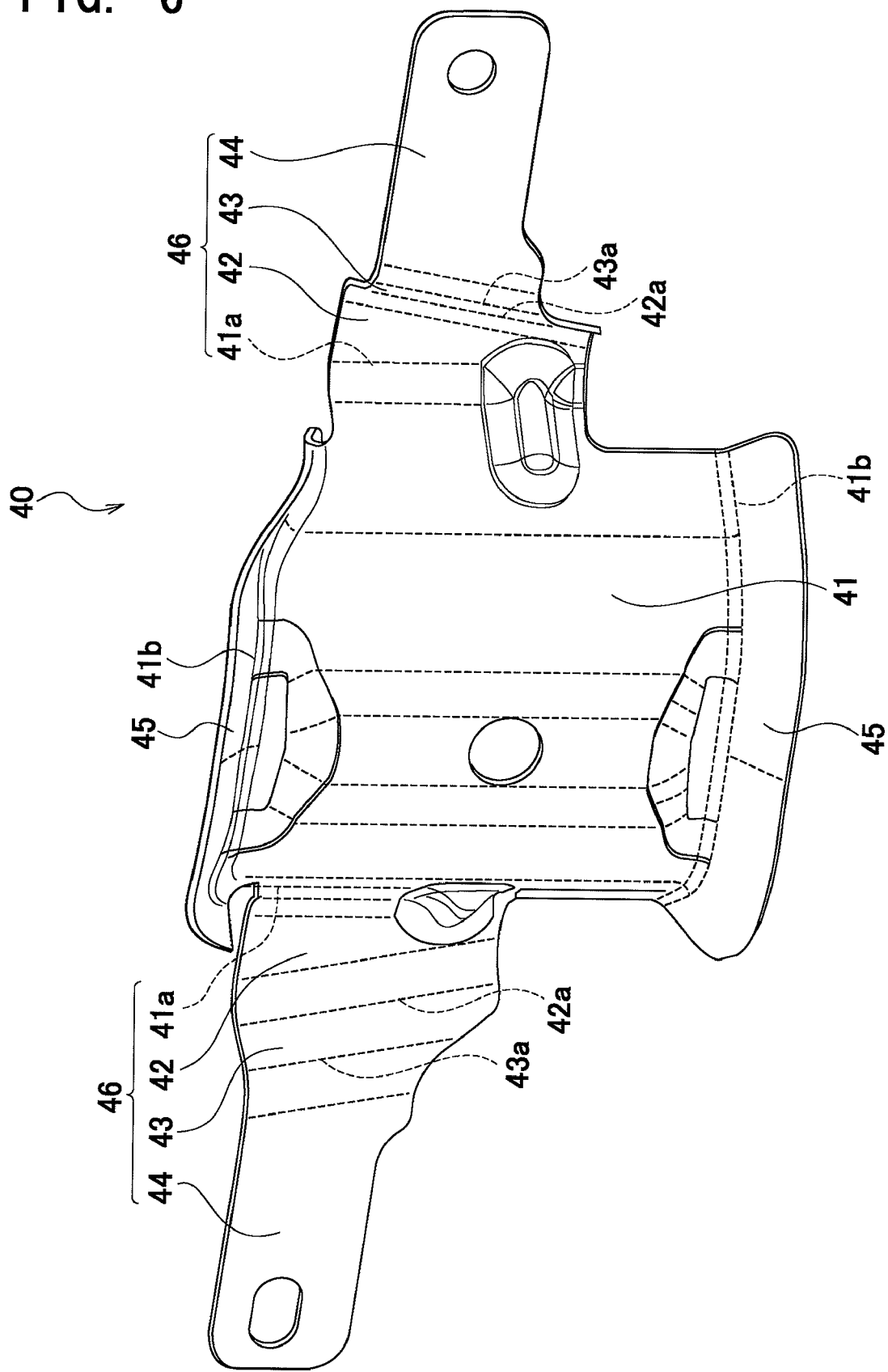
FIG. 6 is a schematic perspective view of a protective member.
Figure 7:
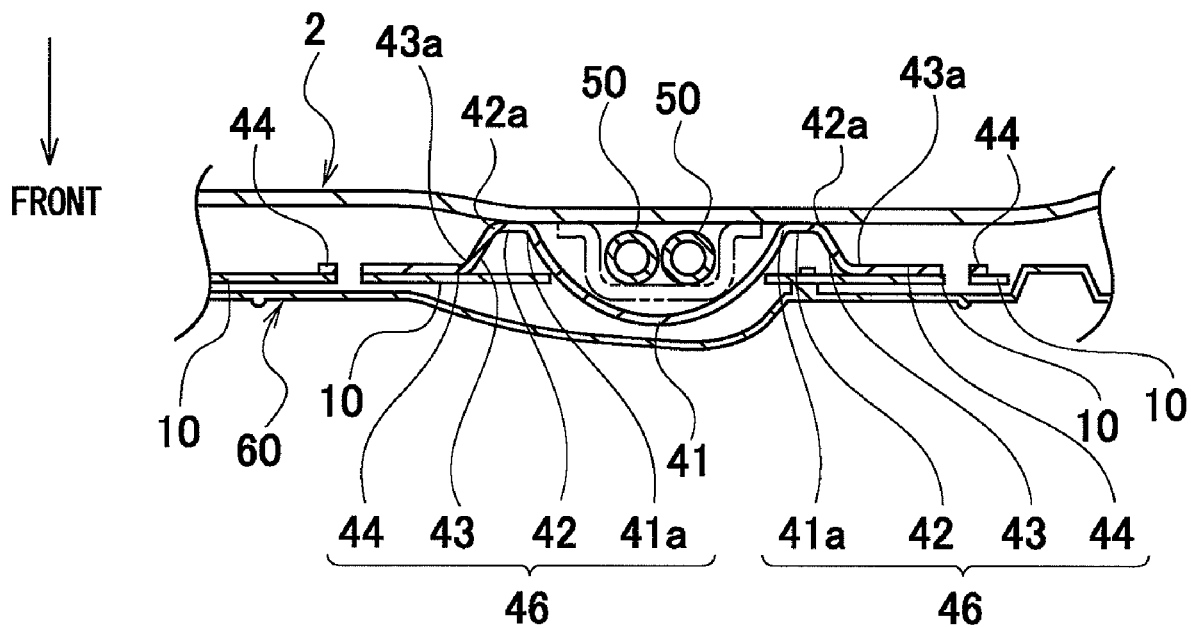
FIG. 7 is a schematic view showing a state of a front panel having received an impact from a front of a vehicle.

Now, an embodiment of the present invention will be described based on the accompanying drawings. FIG. 1 is an external perspective view of a vehicle front structure according to this embodiment, FIG. 2 is a schematic front view of the vehicle front structure according to this embodiment, FIG. 3 is a cross-sectional view taken along an I-I arrow in FIG. 2, FIG. 4 is a schematic perspective view of a center reinforcing member, FIG. 5 is a schematic perspective view of a side reinforcing member, FIG. 6 is a schematic perspective view of a protective member, and FIG. 7 is a schematic view showing a state of a front panel having received an impact from the front of a vehicle. In FIG. 1, "UP" indicates an upside of the vehicle while "FRONT" indicates a front side of the vehicle.

As shown in FIG. 1 to FIG. 7, a vehicle front structure 1 includes a front panel 10 being a front plate member, a center reinforcing member 20, side reinforcing members 30, protective members 40, and pipes 50 being linear members.

The front panel 10 includes a panel body 11 being disposed on a front surface of a vehicle body 2 in a vehicle-width direction and having a substantially plate shape, an upper joint 12 extending toward the back of the vehicle from an upper edge portion 11a of the panel body 11, an extending portion 13 extending toward the lower back of the vehicle from a lower edge portion 11b of the panel body 11, and a lower joint 14 extending downward from a lower edge portion 13a of the extending portion 13. Moreover, the center reinforcing member 20 is provided substantially in a center portion of a rear surface of the front panel 10, the side reinforcing members 30 are provided on outside portions in the vehicle-width direction of the rear surface thereof, and the protective members 40 are provided on a lower edge portion of the rear surface thereof.

The center reinforcing member 20 has a substantially plate shape and includes a lower joint 21 to be joined to a rear surface of the lower joint 14 of the front panel 10, side extending portions 22 respectively extending outward in the vehicle-width direction and toward the back of the vehicle from edge portions 21a located on outer sides in the vehicle-width direction of the lower joint 21, and flange portions 23 respectively extending outward in the vehicle-width direction from edge portions 22a located on outer sides in the vehicle-width direction of the side extending portions 22. Moreover, the center reinforcing member 20 includes a middle extending portion 24 extending upward and toward the front of the vehicle from an upper edge portion 21b of the lower joint 21, an extending portion 25 extending upward and spreading outward in the vehicle-width direction from an upper edge portion 24a of the middle extending portion 24, and an upper joint 26 extending toward the back of the vehicle from an upper edge portion 25a of the extending portion 25 and to be joined to a lower surface of the upper joint 12 of the front panel 10.

Each side reinforcing member 30 has a substantially plate shape and includes a lower joint 31 to be joined to the rear surface of the lower joint 14 of the front panel 10 and a flange portion 32 extending toward the back of the vehicle and then downward from a lower edge portion 31a of the lower joint 31. Moreover, the side reinforcing member 30 includes a middle extending portion 33 extending upward and toward the front of the vehicle from an upper edge portion 31b of the lower joint 31, an extending portion 34 extending upward from an upper edge portion 33a of the middle extending portion 33, and an upper joint 35 extending toward the back of the vehicle from an upper edge portion 34a of the extending portion 34 and to be joined to the lower surface of the upper joint 12 of the front panel 10.

Each protective member 40 has a substantially plate shape and includes a cover portion 41 protruding toward the front of the vehicle and having a substantially U-shape in a cross-sectional view, body contacting portions 42 respectively extending outward in the vehicle-width direction from edge portions 41a located on outer sides in the vehicle-width direction of the cover portion 41, and flange portions 45 respectively extending toward the front of the vehicle from edge portions 41b located on sides in a vertical direction of the cover portion 41. Moreover, the protective member 40 includes extending portions 43 respectively extending toward the front of the vehicle and outward in the vehicle-width direction from edge portions 42a located on outer sides in the vehicle-width direction of the body contacting portion 42, and joints 44 respectively extending outward in the vehicle-width direction from edge portions 43a located on outer sides in the vehicle-width direction of the extending portion 43 and to be joined to the rear surface of the lower joint 14 of the front panel 10. Here, sets of the edge portion 41a, the body contacting portion 42, the extending portion 43, and the joint 44, the sets located at outer sides in the vehicle-width direction of the cover portion 41, each constitute an impact absorbing portion 46 having a substantially U-shape in a cross-sectional view and protruding toward the back of the vehicle.

In the state where the front panel 10 is mounted on the front surface of the vehicle body 2, the cover portion 41 of the protective member 40 covers, from the front side of the vehicle, the pipes 50 provided to the vehicle body 2 in a vertical direction. Here, the pipes 50 cross along the rear surface of the front panel 10 at the rear surface side on the lower edge portion of the front panel 10. Meanwhile, at a lower side of the front panel 10, a radiator grill 60 is mounted on the front surface of the vehicle body 2 so as to cover the protective member 40 from the front surface side of the vehicle.

With the above-described structure, as shown in FIG. 7, when the front panel 10 receives an impact from the front of the vehicle, this impact is transmitted from a peripheral portion of the front panel 10 to the impact absorbing portions 46 of the protective member 40 (see FIG. 3). Then, the body contacting portion 42 of the impact absorbing portion 46 contacts the vehicle body 2 earlier than the rear surface of the cover portion 41 contacting the pipes 50. The impact absorbing portion 46 prevents the front panel 10 from moving toward the back of the vehicle by contacting the vehicle body 2 and absorbs the impact by being deformed. Accordingly, as the impact absorbing portion 46 absorbs the impact, the impact to be applied to the cover portion 41 between the two impact absorbing portions 46 is reduced. For this reason, the pipes 50 covered with the cover portion 41 are reliably protected. Meanwhile, since the protective member 40 is fixed to the front panel 10, the construction of the vehicle body 2 around the pipes 50 can be simplified.

Moreover, the cover portion 41 and the impact absorbing portions 46 are integrally formed. Accordingly, it is possible to reduce the number of components and to simplify the construction of the protective member 40.

Further, the flange portions 45 of the cover portion 41 are bent toward the front of the vehicle. Accordingly, rigidity of the cover portion 41 can be increased.

Figure 8:
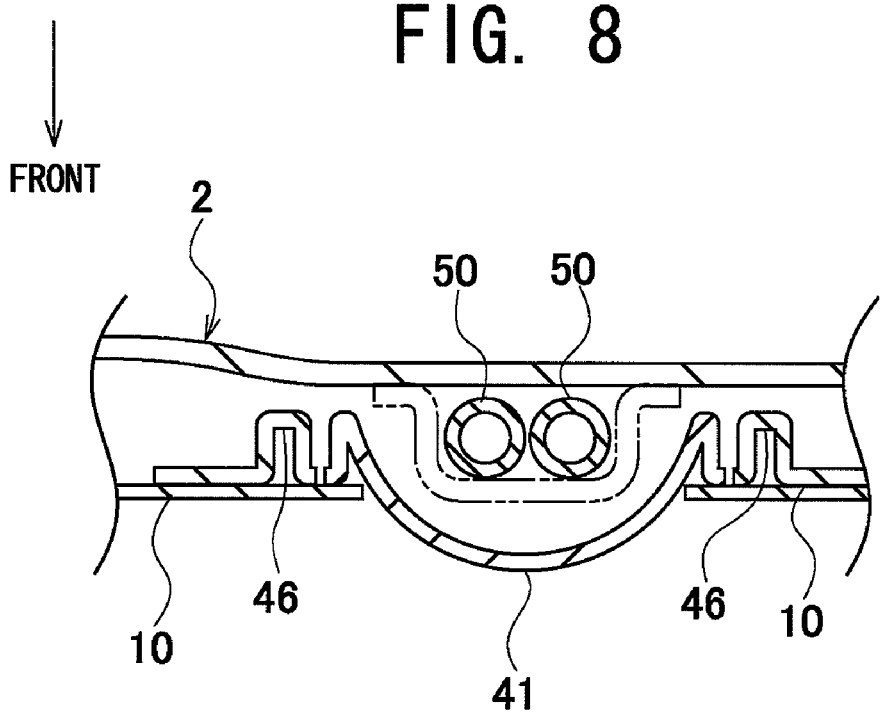
FIG. 8 is a schematic view showing an example of providing a cover portion and impact absorbing portions using separate members.

Although the cover portion 41 and the impact absorbing portions 46 are integrally formed in this embodiment, the cover portion 41 and the impact absorbing portions 46 may be formed of separate members as shown in FIG. 8.

Meanwhile, the pipes 50 may be disposed at other positions of the vehicle body 2 as long as they are configured to cross, along the rear surface of the front panel 10, the peripheral portion of the front panel 10 at the rear surface side of the front panel 10. Further, the position to fix the protective member 40 is not limited to the lower joint 14 of the front panel 10 as long as it is configured to cover the pipes 50 crossing along the rear surface of the front panel 10.

Moreover, the pipes 50 to be covered with the cover portion 41 may be harnesses or the like.

Meanwhile, although the front panel 10 and the protective member 40 are formed of separate members in this embodiment, they may be formed integrally.

Further, although this embodiment shows the example of applying the vehicle front structure 1 according to the present invention to the front panel 10 mounted on the front surface of the vehicle body 2, it is also possible to apply the vehicle front structure 1 according to the present invention to a lid to be attached to a notch portion formed in the front panel 10.

Meanwhile, in this embodiment, each of the cover portion 41 and the impact absorbing portion 46 has a substantially U-shape in a cross-sectional view. However, a substantially square-cornered U-shape in a cross-sectional view or a substantially V-shape in a cross-sectional view may also be employed.

Although the embodiment employing the invention made by the inventor has been described above, the present invention shall not be limited by any of the description and the drawings of the embodiment that constitute part of the disclosure of the present invention. That is, it is needless to say that all other embodiments, examples, and operation techniques to be carried out by those skilled in the art based on this embodiment are encompassed by the scope of the present invention.

Industrial Applicability

The vehicle front structure of the present invention is applicable to various vehicles.

The invention claimed is:

1. A vehicle front structure comprising:
   a front plate member mounted on a front surface of a vehicle body of a vehicle;
   a linear member which is arranged ahead of the vehicle body in a direction of a front side of the vehicle, and crosses, along a rear surface of the front plate member, a peripheral portion of the front plate member at a rear surface side of the front plate member; and
   a protective member having a substantially plate-like shape, which is fixed to the front plate member and extends in the vehicle-width direction,
   wherein the protective member includes:
      a cover portion which has a substantially U-shape in a cross-sectional view protruding toward a front of the vehicle and covering the linear member from the front side of the vehicle; and
      at least two impact absorbing portions extending from the cover portion in the vehicle-width direction at both sides of the linear member, and each having a first portion of substantially U-shape in a cross-sectional view which protrudes toward a back of the vehicle and does not protrude toward the cover portion.

2. The vehicle front structure according to claim 1, wherein the cover portion and the impact absorbing portions are integrally formed, and
   each of the impact absorbing portions further has a second portion which is disposed distally from the cover portion and bent from the first portion toward the front of the vehicle, in a direction intersecting the linear member.

3. The vehicle front structure according to claim 1, wherein edge portions of the cover portion in a direction along the linear member are bent toward the front of the vehicle.

4. The vehicle front structure according to claim 2, wherein edge portions of the cover portion in a direction along the linear member are bent toward the front of the vehicle.

* * * * *